(12) United States Patent
Rodriguez et al.

(10) Patent No.: US 10,631,375 B2
(45) Date of Patent: Apr. 21, 2020

(54) EMERGENCY LIGHTING SYSTEM

(71) Applicant: ABL IP Holding LLC, Atlanta, GA (US)

(72) Inventors: Yan Rodriguez, Suwanee, GA (US); James C. Johnson, Conyers, GA (US); Ray Altenburger, Oxford, GA (US); Allen Carmichael, Jackson, GA (US); Dean Mavis, McDonough, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/547,784

(22) Filed: Aug. 22, 2019

(65) Prior Publication Data

US 2019/0380182 A1 Dec. 12, 2019

Related U.S. Application Data

(63) Continuation of application No. 15/794,143, filed on Oct. 26, 2017, now Pat. No. 10,455,655, which is a continuation of application No. 14/725,913, filed on May 29, 2015, now Pat. No. 9,832,826.

(60) Provisional application No. 62/005,341, filed on May 30, 2014.

(51) Int. Cl.
*H05B 33/08* (2020.01)
*H02J 9/06* (2006.01)
*H05B 37/02* (2006.01)

(52) U.S. Cl.
CPC .......... *H05B 33/0842* (2013.01); *H02J 9/061* (2013.01); *H05B 37/0227* (2013.01); *Y10T 307/344* (2015.04)

(58) Field of Classification Search
None
See application file for complete search history.

(56) References Cited

U.S. PATENT DOCUMENTS

| | | | |
|---|---|---|---|
| 5,202,608 | A | 4/1993 | Johnson |
| 5,666,029 | A | 9/1997 | McDonald |
| 5,814,971 | A | 9/1998 | Johnson |
| 8,823,272 | B2 | 9/2014 | Trainor et al. |
| 9,035,622 | B2 | 5/2015 | Huang |
| 9,832,826 | B2 | 11/2017 | Rodriguez et al. |
| 2013/0328402 | A1* | 12/2013 | Noguchi ........ H02J 9/06 307/66 |
| 2014/0312699 | A1 | 10/2014 | Wang |

(Continued)

FOREIGN PATENT DOCUMENTS

CA 2893340 4/2019

OTHER PUBLICATIONS

U.S. Appl. No. 14/725,913, "Non-Final Office Action," dated Apr. 20, 2017, 12 pages.

(Continued)

*Primary Examiner* — Jared Fureman
*Assistant Examiner* — Aqeel H Bukhari
(74) *Attorney, Agent, or Firm* — Kilpatrick Townsend & Stockton LLP

(57) ABSTRACT

Battery charge function may be in an LED driver which eliminates the duplication of line interface circuitry. A single line interface circuit provides the input power conversion for both the battery charge function and normal operation of the LED driver. During a loss of power, the LEDs may be controlled using power from the battery backup module.

19 Claims, 8 Drawing Sheets

(56) References Cited

U.S. PATENT DOCUMENTS

2014/0354048 A1    12/2014   Chen et al.
2015/0349586 A1    12/2015   Rodriguez et al.
2017/0271914 A1*   9/2017    Crenshaw .......... H05B 37/0263
2018/0049288 A1    2/2018    Rodriguez et al.

OTHER PUBLICATIONS

U.S. Appl. No. 14/725,913, "Amendment and Response to Non-Final Office Action for U.S. Appl. No. 14/725,913," filed Jul. 11, 2017, 12 pages.
U.S. Appl. No. 14/725,913, "Notice of Allowance," dated Aug. 2, 2017, 7 pages.
U.S. Appl. No. 15/794,143, "Notice of Allowance," dated Jun. 7, 2019, 11 pages.
CA2,893,340, "Notice of Allowance," dated Sep. 14, 2018, 1 page.
CA2,893,340, "Office Action," dated Sep. 14, 2017, 3 pages.
CA2,893,340, "Office Action," dated Oct. 3, 2016, 7 pages.

* cited by examiner

EMERGENCY LIGHTING SYSTEM

RELATED APPLICATION

This application claims priority to U.S. Provisional Patent Application No. 62/005,341 filed May 30, 2014 and entitled "Emergency Lighting Systems," which is incorporated herein in its entirety by this reference. This application is a continuation of allowed U.S. application Ser. No. 15/794,143, filed Oct. 26, 2017 and entitled "Emergency Lighting System," which is a continuation of patented U.S. application Ser. No. 14/725,913, filed May 29, 2015 and entitled "Emergency Lighting System," which claims priority to U.S. Provisional Patent Application No. 62/005,341 filed May 30, 2014 and entitled "Emergency Lighting Systems," each of which are incorporated herein in their entirety by this reference.

FIELD OF THE INVENTION

This invention generally relates to the field of lighting, specifically to emergency lighting.

BACKGROUND OF THE INVENTION

The need to provide an emergency path of egress lighting when normal power is lost is well known. In order to meet this need it is common practice to provide some form of battery-powered lighting in a given space. It is often convenient and desirable to provide this battery-powered auxiliary lighting within the standard or existing light fixtures. Batteries utilized in these systems are continuously charged and maintained in a full charge state. Thus, the battery charging function remains turned on and uninterrupted (i.e., unswitched) at all times.

In present practice a fluorescent ballast or a light-emitting diode (LED) driver provides for the normal operation of the fixture's light source and this device may be switched on and off. A separate battery backup unit then provides the functions of battery charging, input line voltage detection, power conversion, load transfer switching and test operations. This unit, since it contains the battery charging function, remains on at all times and is unswitched.

In the lighting industry, input line voltages typically range from 120 volts to 277 volts AC, operating at a frequency of 60 Hz. The input line voltage is often called line voltage, mains, main power supply, or main input supply. In some cases, other frequencies and even higher voltages are utilized, such as 347 volts and 480 volts. Thus the ballast or driver, as well as the battery backup module, should be capable of accepting at least these voltage levels through line interface circuitry. It will be understood that this interface to the power main is critical, and the associated circuitry will be the most vulnerable to external phenomenon (e.g., power surges, lightning strikes, equipment failures, fluctuations in power, etc). In present practice, there is duplication of the line interface function, since it is present in both the ballast or driver and the battery backup module. The line interface function is not trivial, and it requires high power factor, transient protection, electromagnetic interference (EMI) suppression, as well as start-up accommodations and many other features.

Thus, to reduce cost and the possibility of failure, it is desirable to reduce the quantity of line interface circuits, while maintaining the full functionality of the battery charging functions and ballast or driver during both normal operation and emergency operation. It is also desirable to increase communication between the ballast or driver and the battery backup module, to improve both normal and emergency operation of the lighting system.

BRIEF SUMMARY OF THE INVENTION

In a first aspect of the invention, the battery charge function may be integrated into the LED driver. This eliminates the duplication of the line interface circuitry. A single line interface circuit provides the input power conversion for both the battery charge function and normal operation of the light source. In this particular implementation the LED driver is unswitched, meaning that is it always connected to main power. The LED driver may be of any suitable configuration known to those skilled in the art (e.g., two-input or three-input, etc.) The lighting elements, e.g., LEDs are driven by a lighting interface located, in various implementations, in one or both of the LED driver or battery backup unit. On/off switching and other control of the light source may be accomplished in response to other external inputs that may be received by the driver or, alternatively, by the battery backup unit.

There are multiple methods of obtaining battery charge current from the LED driver. One method is to provide a separate channel from the driver to the battery backup module, programmed to provide the desired charge current level. As an alternative implementation, charge current may be obtained from a parallel connection with the LED lighting elements, or as a further alternative, from a series connection with the LEDs. In these latter two cases special considerations may be given to the effects of light dimming on the charge current when the dimming function is to be utilized, and on/off control may be accomplished by a load transfer switching scheme that would not affect the charge current. Since the source of the battery charging current is to be energized at all times, and the LED driver may be the source of charge current in some of the described implementations, the on/off switching information may be communicated by separate means. This may be accomplished by a simple contact closure, or may be accomplished by a suitable relay, field emission transistor (FET) configuration, control signal inputs as described below, or other switch method known to those skilled in the art.

Other aspects of the invention provide new features for the emergency lighting system. Many of these improvements utilize the capabilities of an LED driver, such as programmable channels, which allow one channel to be used for charging a battery backup unit while other channels are used to drive the LEDs; serialized communications, which allow communication between the battery backup unit and the LED driver and enable on-the-fly adjustments of driver outputs; and dual sourcing of power, which allows the LED driver to receive power from the battery backup unit during emergency operation and power from the main input supply during normal operation. Many LED drivers also include an external control signal input which may be used to implement the on/off function, dimming, color selection, test functions, or other suitable operations apparent to those skilled in the art. Control signals may be transmitted using 0-10V voltage control, DMX, DALI, or any other suitable protocol. It will be recognized by those of ordinary skill in the art that any available or future-developed control communication protocol could be used for this same purpose including, but not limited to, those protocols listed in Illumination Engineering Society publication TM-23-11.

Various implementations of the emergency lighting system may include direct connections between the LED driver and the lighting elements, wherein the LED driver directly powers the lighting elements during normal operation and/or emergency operation. Various other implementations of the system may include connections from the LED driver to the lighting elements that are passed through the battery backup module, wherein the battery module may draw charging current from the passthrough connections during normal operation. Still further implementations may include connections from the LED driver to the lighting elements that are passed through the battery backup module, wherein the connections pass through for monitoring or test activation without providing charge to the battery module.

Normal operation takes place when the mains are providing input line voltage at an expected level. The expected level will vary as known to one skilled in the art, depending on the use (e.g., residential, commercial, manufacturing, etc.) and geographical region. Emergency operation occurs when an interruption (e.g., blackout, brownout, equipment failure, etc.) of the expected input line voltage occurs, and the mains are unable to supply sufficient input to continue normal operations. During emergency operations, the number of light sources operated may be none, some, or all of the sources available during normal operations, and the sources may be dimmed or otherwise operated at a reduced output.

The battery backup module may also be identified as the battery backup unit, the battery, or other similar terms as apparent to those skilled in the art. The LED driver module may also be referred to as the LED driver unit, the driver, the LED driver, or other similar terms apparent to those skilled in the art.

DETAILED DESCRIPTION OF THE INVENTION

The implementations of the invention depict various methods or configurations to reduce the number of line interface circuits needed, while maintaining or increasing functionality of the exemplary emergency lighting systems. The line interface may be located in the battery backup module or the LED driver. The lighting interface to connect to the lighting elements may be included in the battery backup module or the LED driver module, or, in certain implementations, both modules may include a lighting interface. In some specific implementations, power for emergency operations may be supplied from the battery backup through an input of the LED driver. Charging of the battery may be accomplished by a dedicated charging output from the driver in some implementations, or by diverting current from the lighting interface in other implementations.

In some implementations, control signals from an external source determining the normal operation of the light elements may be received through one or more control inputs. Control signals may include on/off information, as well as dimming, pulse width modulation (PWM) mode, color selection, test operations, or other options known to those skilled in the art. As described above, the control signals may use any suitable protocol known to those skilled in the art. The control inputs may also carry status information for the main power supply (e.g., if the main power supply is interrupted or not), or depending upon the implementation, such status information may be received on a separate input of the battery unit or the driver. This status information regarding the mains may be used to determine if the lighting system will operate in emergency mode (e.g., begin using battery backup power) or operate in normal mode (e.g., continue using power from mains). Besides the mains status information, other control signals, including signals for test functions, may also be used to determine if the lighting system will operate in emergency or normal mode.

Certain implementations may further include control signal inputs and outputs between the LED driver and battery backup unit. Certain other implementations may include a communication channel between the LED driver and the battery backup module, for sharing internal state information, adjustments, or other information apparent to those skilled in the art. LED code or other suitable protocols known to the art may be used for communication on the shared communication channel.

In the following descriptions, similar figure numbers are used to refer to similar features of the invention implementations.

Figure 1:
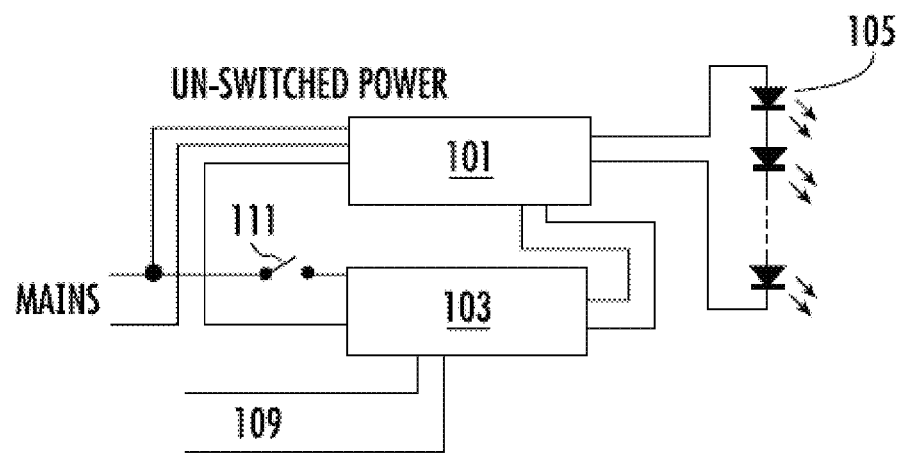
FIG. 1 is a block diagram showing an exemplary prior art system in which both the battery backup unit and the LED driver include a line interface circuit.

FIG. 1 is a block diagram showing a prior art system in which the LED driver 103 may include a line interface circuit to the main power supply. The battery backup unit 101 may include a second line interface circuit to the main power supply. During normal operation, the LED driver controls the LEDs 105 using a lighting interface included in the LED driver. The connections from the lighting interface to the lighting elements 105 may be routed through the battery backup unit 101. The LED driver 103 may receive control signal inputs 109 from an external source to determine normal operation of the LED lighting element 105, or may have an optional on/off switch 111 on the main power line. The battery backup unit 101 is charged by the main power supply through the second line interface circuit. Emergency operation may be entered if the main power supply no longer supplies power to the battery backup unit 101 through the line interface. In emergency operation, the battery backup unit 101 supplies DC power directly to the lighting elements 105 through a second lighting interface. The LED driver 103 is not used.

Figure 2:
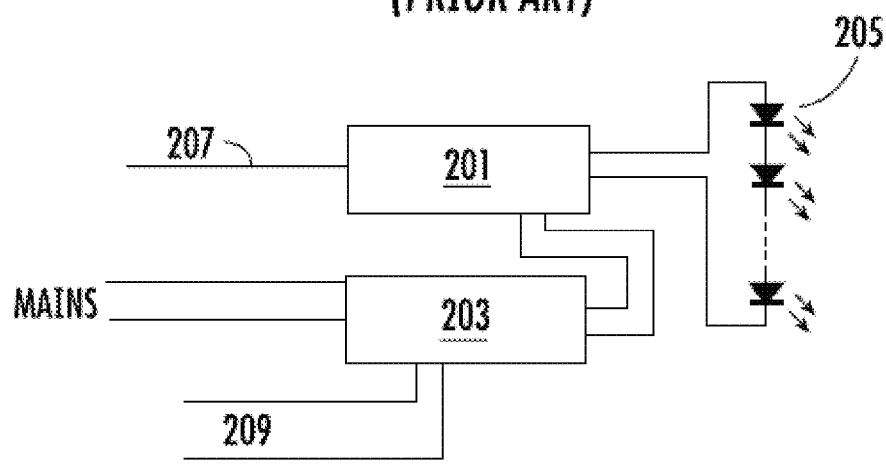
FIG. 2 is a block diagram of an exemplary system including a battery backup unit and an LED driver, where the battery backup unit receives charging current through the connection to the lighting elements.

FIG. 2 is a block diagram of an exemplary system in which the LED driver 203 may include a line interface circuit, which may be powered by the unswitched main power supply, to provide charging current for the battery 201 and detection of loss of the main power. If the line interface indicates the main power supply has been interrupted, the system may enter emergency operation. An on/off status input 207 to the battery backup unit 201 may provide status information regarding the desired on/off state of the lighting elements 205. During normal operation, the LED driver 203 may drive the lighting elements 205 using an included lighting interface. The connections from the lighting interface to the lighting elements 205 may be routed through the battery backup unit 201, and the battery unit 201 may be charged by a portion of current diverted from the current driving the lighting elements 205. During emergency operation, the battery unit 201 supplies DC power directly to the lighting elements 205 through a second lighting interface included in the battery backup unit, and the LED driver 203 is not used.

Figure 3:
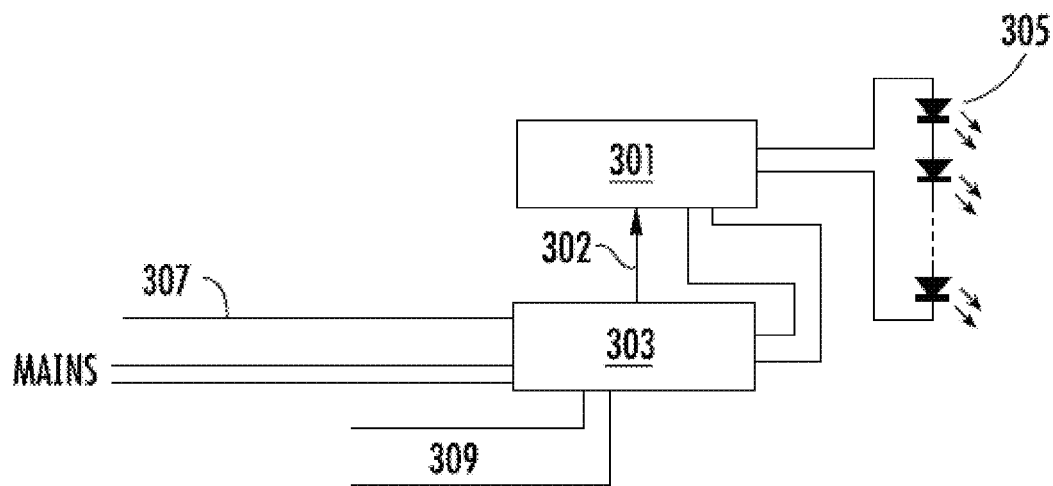
FIG. 3 is a block diagram of an exemplary system including a battery backup unit and an LED driver, where the LED driver provides charging current to the battery backup unit.

FIG. 3 is a block diagram of an exemplary system in which the LED driver 303 may include a line interface circuit, which may be powered by the unswitched main power supply, to provide charging current for the battery 301 and detection of loss of the main power. A status input 307 to the LED driver 303 may provide status information of the desired on/off state of the lighting elements 305. During normal operation, the LED driver 303 may drive the lighting elements 305 using an included lighting interface. The connections from the lighting interface may be routed through the battery backup unit 301 for testing or line monitoring; emergency mode may be entered if the line monitoring indicates that the main power supply is interrupted. Charge current for the battery unit 301 may be obtained through a charging output 302 from the driver 303. Control signals for normal operations of the elements 305 may be received on control inputs 309 to the driver 303. During emergency operation, the LED driver 303 may no longer provide charging current or mains status information, and the battery backup module 301 may drive the elements 305 using a second lighting interface included in the battery backup module.

Figure 4:
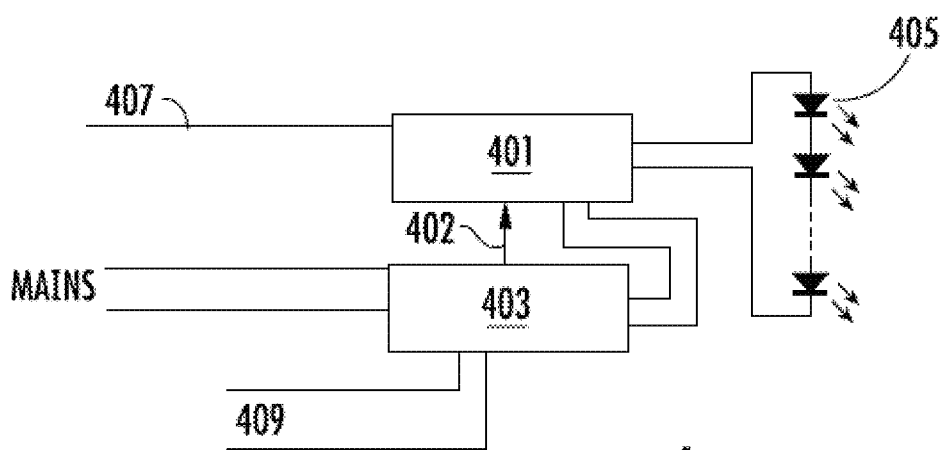
FIG. 4 is a block diagram of another exemplary system including a battery backup unit and an LED driver, where the LED driver provides charging current to the battery backup unit.

FIG. 4 is a block diagram of an exemplary system similar in configuration and operation to that shown by FIG. 3, except that in FIG. 4 the status input 407 regarding the desired on/off state of the lighting elements 405 is provided to the battery backup module 401.

Figure 5:
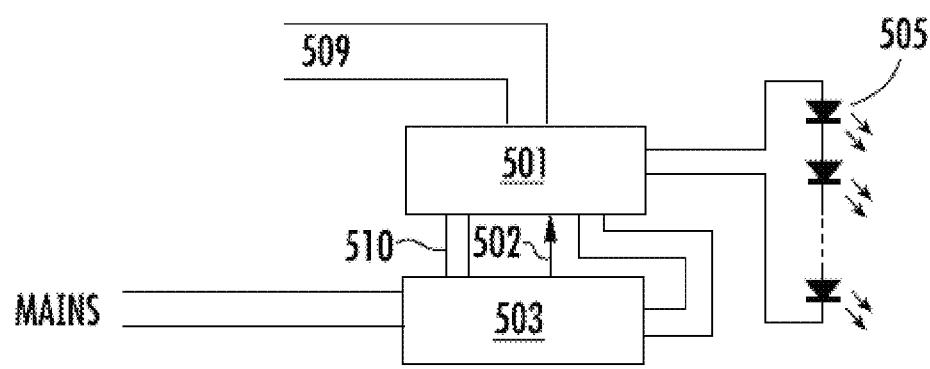
FIG. 5 is a block diagram of a further exemplary system including a battery backup unit and an LED driver, where the LED driver provides charging current to the battery backup unit.

FIG. 5 is a block diagram of an exemplary system in which the LED driver 503 may include a line interface circuit, which may be powered by the unswitched main power supply, to provide charging current for the battery 501 and detection of loss of the main power. Control signals for normal operations may be received on control inputs 509 to the battery backup module 501. The control signals may also be passed through the battery backup unit 501 to the LED driver 503 using the control inputs/outputs 510. During normal operation, charge current for the battery unit 501 may be obtained through a charging output 502 from the LED driver 503. The lighting elements 505 are driven by the LED driver 503, using an included lighting interface. The connections from the lighting interface may be routed through the battery backup unit 501 for testing or line monitoring. Emergency operation may be entered if the loss of charge current on charging output 502 indicates that the main supply is interrupted. During emergency operation, the elements 505 are powered by the battery backup module 501 using a second lighting interface included in the battery backup module, and the LED driver 503 is not used.

Other implementations of the invention include battery backup units that may provide emergency power to an intermediate voltage of the LED driver. It is common practice for the LED driver to convert the AC power input to DC voltage. This DC voltage is an intermediate power supply that may power the lighting interface(s) of the driver and also the internal functions of the driver. If the battery backup unit provides this intermediate power during an interruption in the main power supply, then the LED driver lighting interface may continue to function and may set the output LED current as desired for a given run time, brightness, and number of lighting elements. In this way the driver retains control of the LEDs during the power outage. In this implementation, the LED driver must recognize the presence of the battery backup power and switch to an output current consistent with the desired light output and run-time for the emergency operation.

Figure 6:
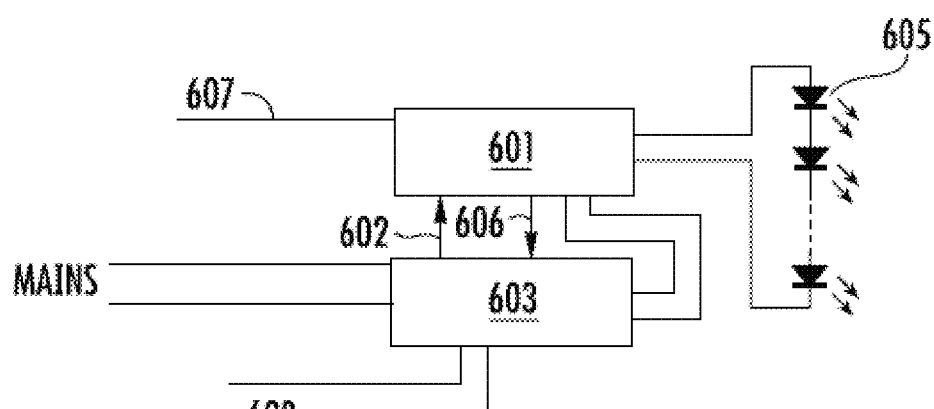
FIG. 6 is a block diagram of an exemplary system including a battery backup unit and an LED driver, where the LED driver provides charging current to the battery backup unit, and the battery backup unit provides emergency power to the LED driver.

FIG. 6 is a block diagram of an exemplary system in which the LED driver 603 may include a line interface circuit, which may be powered by the unswitched mains voltage to provide charging current for the battery 601. A status input 607 may provide the desired on/off state of the lighting elements 605. During normal operation, the LED driver 603 may drive the lighting elements 605 using an included lighting interface. Charge current for the battery backup unit 601 may be obtained through a charging output 602 from the driver 603. Control signals for normal operations of the elements 605 may be received on control inputs 609 to the driver 603. Emergency operation may be entered if the loss of charge current on charging output 602 indicates that the main power supply is interrupted. During emergency operation, the battery backup unit 601 may provide a DC voltage through a voltage output 606 to a connected input point on the driver 603. The LED driver 603 retains direct control of the LED elements 605 during emergency operations.

Figure 7:
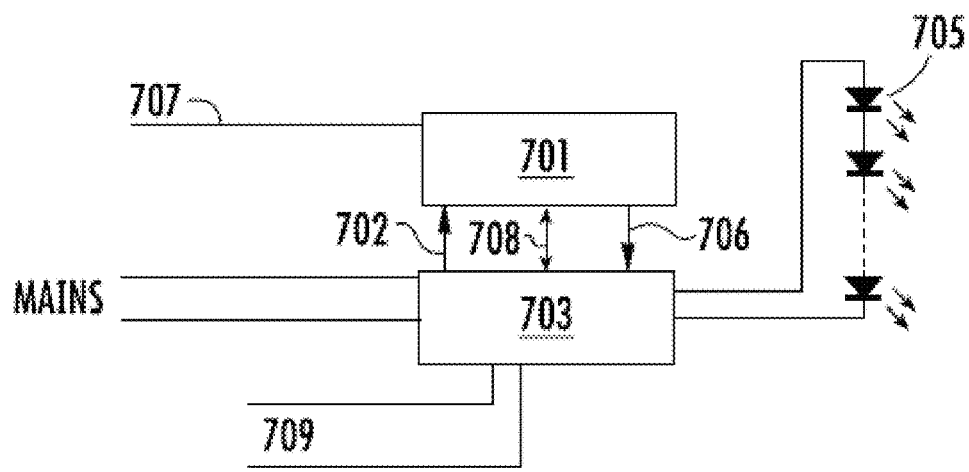
FIG. 7 is a block diagram of an exemplary system including a battery backup unit and an LED driver, where the LED driver provides charging current to the battery backup unit, and the battery backup unit provides emergency power to the LED driver, and there is a communication channel between the LED driver and battery backup unit.

FIG. 7 is a block diagram of an exemplary system in which the LED driver 703 may include a line interface circuit, powered by the unswitched mains voltage to provide charging current for the battery 701. A status input 707 may provide the desired on/off state of the lighting elements 705. A communication channel 708 may be shared between the LED driver 703 and the battery backup module 701. During normal operation, the LED driver 703 may drive the lighting elements 705 using an included lighting interface. Charge current for the battery unit 701 may be obtained through a charging output 702 from the driver 703. Control signals for normal operations of the elements 705 may be received on control inputs 709 to the driver 703. Internal information may be shared between the LED driver 703 and the battery backup module 701 on communication channel 708. Emergency operation may be entered if loss of charge current on the charging output 702 indicates that the main power supply is interrupted. During emergency operation, the battery backup unit 701 may provide a DC voltage supply through a voltage output 706 to a connected input point on the driver 703. The LED driver 703 retains direct control of the LED elements 705 during emergency operations. Communication channel 708 may continue to share information between the LED driver 703 and the battery backup module 701.

Figure 8:
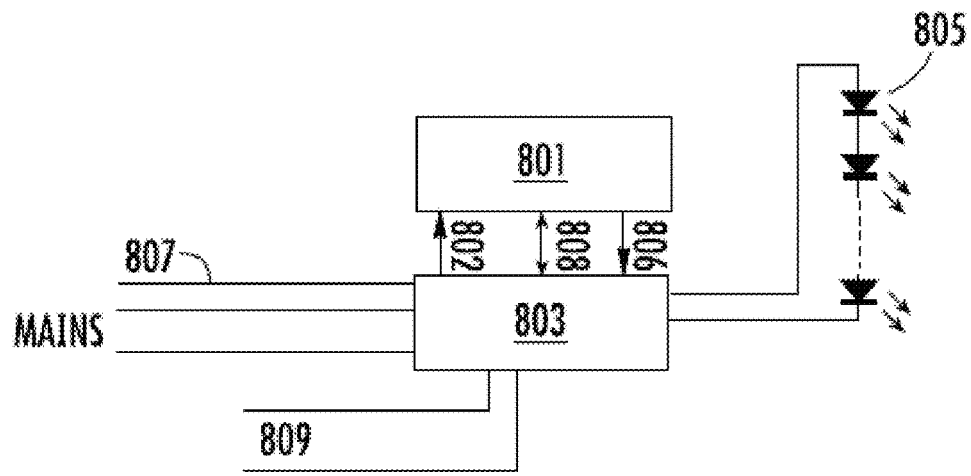
FIG. 8 is a block diagram of a further exemplary system including a battery backup unit and an LED driver, where the LED driver provides charging current to the battery backup unit, and the battery backup unit provides emergency power to the LED driver, and there is a communication channel between the LED driver and battery backup unit.

FIG. 8 is a block diagram of an exemplary system similar in configuration and operation to that shown in FIG. 7, except that in FIG. 8 the status input 807 regarding the desired on/off state of the lighting elements 805 is provided to the LED driver 803.

Figure 9:
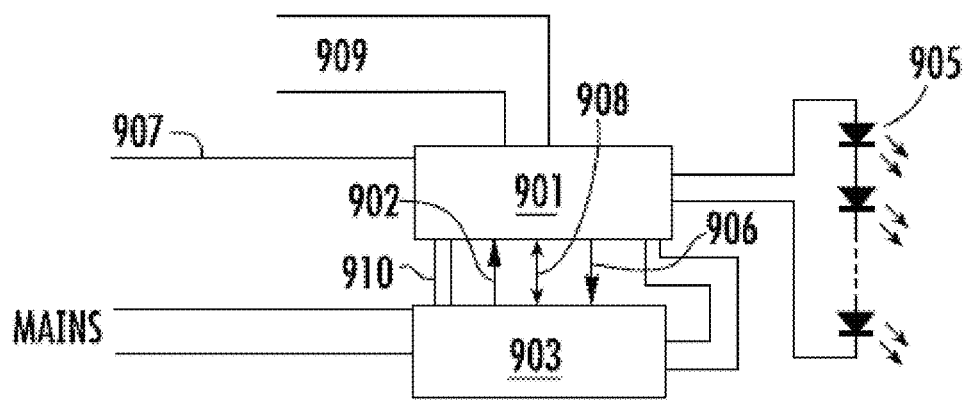
FIG. 9 is a block diagram of a yet further exemplary system including a battery backup unit and an LED driver, where the LED driver provides charging current to the battery backup unit, and the battery backup unit provides emergency power to the LED driver, and there is a communication channel between the LED driver and battery backup unit.

FIG. 9 is a block diagram of an exemplary system in which the LED driver 903 may include a line interface circuit, powered by the mains voltage to provide unswitched charging current for the battery 901. A status input 907 may provide status information of the desired on/off state of the lighting elements 905 to the battery backup unit 901. A communication channel 908 may be shared between the LED driver 903 and the battery backup module 901. During normal operation, the LED driver 903 may drive the lighting elements 905 using an included lighting interface. The connections from the lighting interface may be routed through the battery backup unit 901 for testing or line monitoring. Charge current for the battery unit 901 may be obtained through a charging output 902 from the driver 903. Control signals for normal operations may be received on control inputs 909 to the battery backup module 901. The control signals may also be passed through the battery backup unit 901 to the LED driver 903 using the control inputs/outputs 910. Internal information may be shared between the LED driver 903 and the battery backup module 901 on communication channel 908. Emergency operation may be entered if the status information on control inputs 909 or communication channel 908 indicates that the main supply is interrupted. During emergency operation, the battery backup unit 901 may provide a DC voltage supply through a voltage output 906 to a connected input point on the driver 903. The LED driver 903 retains direct control of the LED elements 905 during emergency operations. Communication channel 908 may continue to share information between the LED driver 903 and the battery backup module 901.

Figure 10:
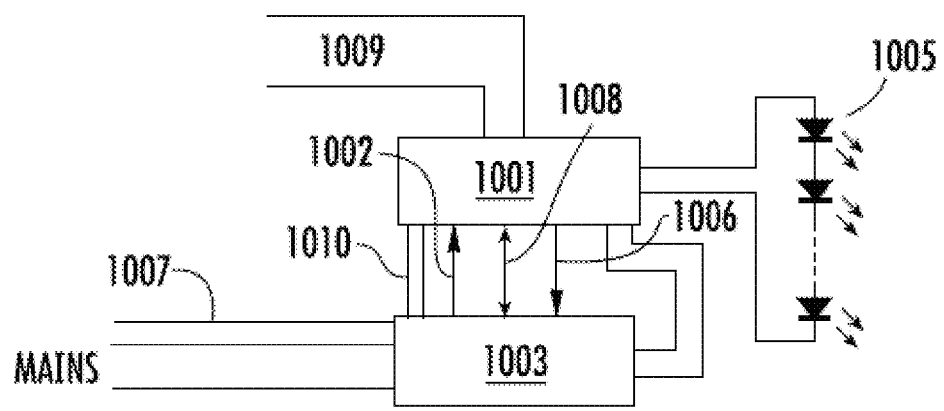
FIG. 10 is a block diagram of a yet further exemplary system including a battery backup unit and an LED driver, where the LED driver provides charging current to the battery backup unit, and the battery backup unit provides emergency power to the LED driver, and there is a communication channel between the LED driver and battery backup unit.

FIG. 10 is a block diagram of an exemplary system similar in configuration and operation to that shown in FIG. 9, except that in FIG. 10 the status input 1007 regarding the desired on/off state of the lighting elements 1005 is provided to the LED driver 1003. The battery backup unit 1001 receives main supply status information through the communication channel 1008 with the LED driver 1003, and/or from the external control signals received on control inputs 1009.

Figure 11:
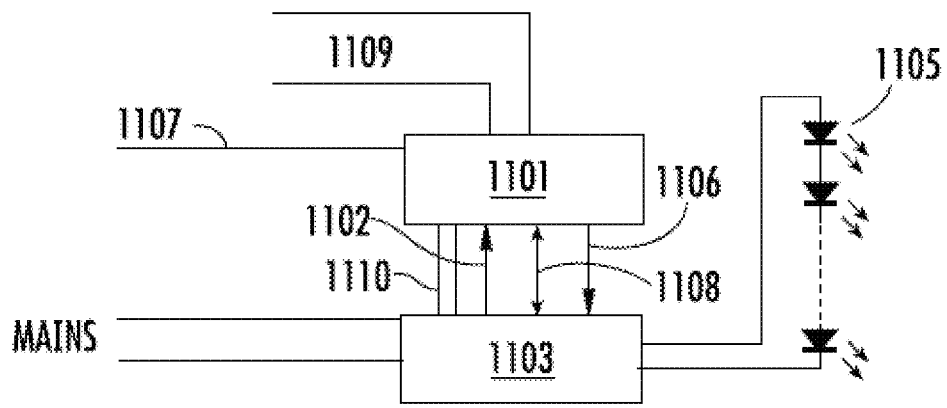
FIG. 11 is a block diagram of a yet further exemplary system including a battery backup unit and an LED driver, where the LED driver provides charging current to the battery backup unit, and the battery backup unit provides emergency power to the LED driver, and there is a communication channel between the LED driver and battery backup unit.

FIG. 11 is a block diagram of an exemplary system similar in configuration and operation to that shown in FIG. 9, except that in FIG. 11, connections from the lighting interface included in LED driver 1103 may connect directly to the lighting elements 1105, instead of being routed through the battery backup unit 1101.

Figure 12:
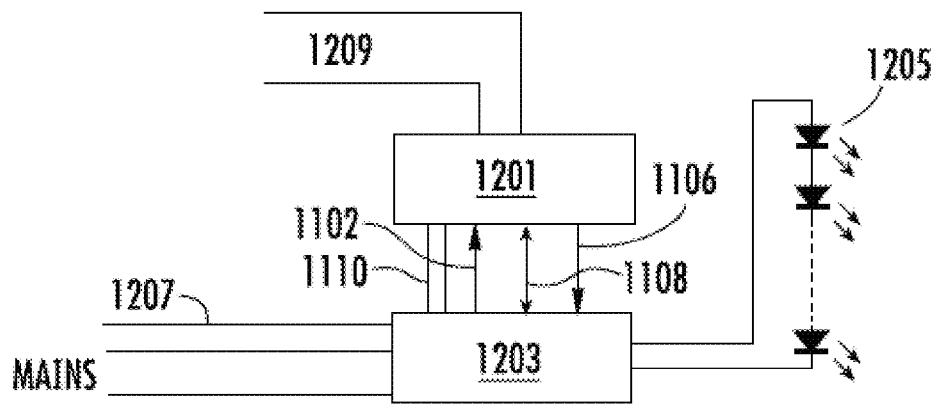
FIG. 12 is a block diagram of a yet further exemplary system including a battery backup unit and an LED driver, where the LED driver provides charging current to the battery backup unit, and the battery backup unit provides emergency power to the LED driver, and there is a communication channel between the LED driver and battery backup unit.

FIG. 12 is a block diagram of an exemplary system similar in configuration and operation to that shown in FIG. 9, except that in FIG. 12, connections from the lighting interface included in LED driver 1203 may connect directly to the lighting elements 1205, instead of being routed through the battery backup unit 1201. Also the status input 1207 regarding the desired on/off state of the lighting elements 1205 is provided to the LED driver 1203, and the battery backup unit 1201 receives main supply status information through the communication channel 1208 with the LED driver 1203, and/or from the external control signals received on control inputs 1209.

Figure 13:
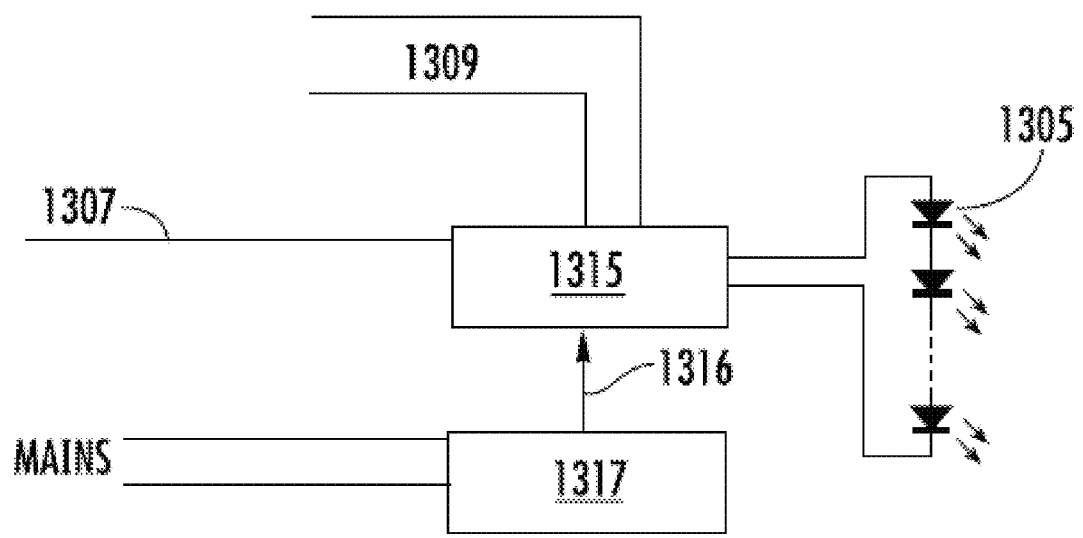
FIG. 13 is a block diagram of an exemplary system in which the line interface circuit is included in a bulk supply unit that provides unswitched power and charging current to a combination battery backup/LED driver unit, which drives the lighting elements.

Other implementations of the invention are also possible. FIG. 13 is a block diagram of an exemplary system in which the line interface circuit is included in a bulk supply unit 1317, such as an emergency power bank, an inverter, or any other locally central power supply. This implementation may be used in systems where a DC supply is provided for multiple emergency lighting systems. The line interface circuitry included in the bulk supply unit 1317 is powered by the mains voltage to provide an unswitched power supply for a combination battery backup/LED driver unit 1315. A status input 1307 may provide desired on/off status information of the lighting elements 1305 to the combination unit 1315. During normal operation, the dedicated output 1316 from the bulk supply unit 1317 may provide power for both battery functions and LED driver functions of the combination unit 1315. The LED driver components of the combination unit 1315 may drive the lighting elements 1305 using an included lighting interface. Charge current for the battery backup components may be obtained through the dedicated power output 1316. Control signals for normal operations may be received on control inputs 1309 to the combination unit 1315. Emergency operation may be entered if the status information on control inputs 1309 indicates that the main supply is interrupted. During emergency operation, the battery backup components included in the combination unit 1315 may provide a DC voltage to the included LED driver components, which retain direct control of the LED elements 1305.

Figure 14:
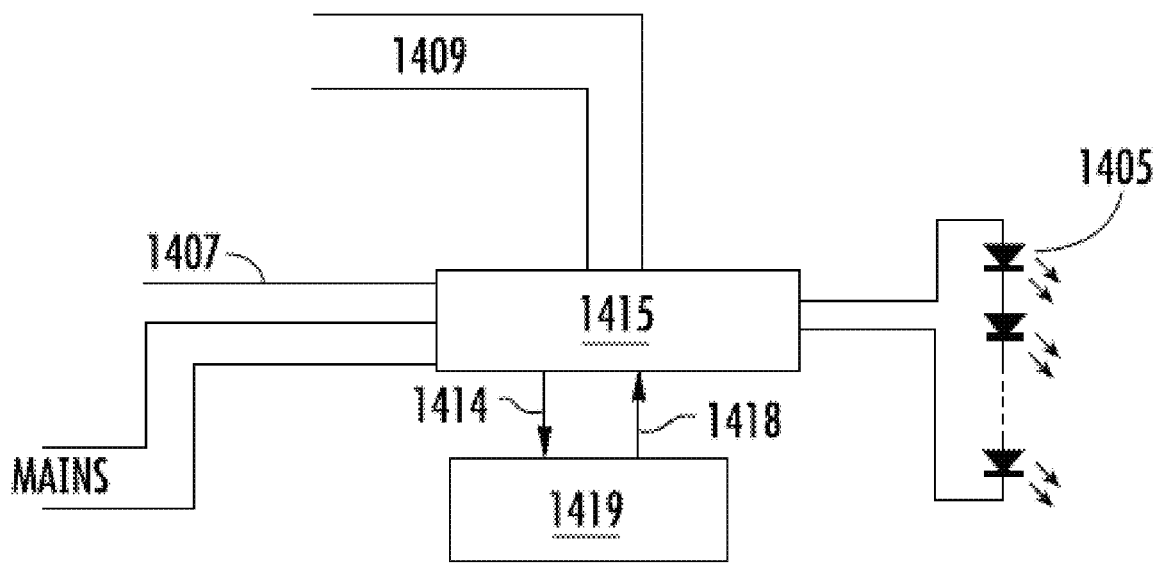
FIG. 14 is a block diagram of an exemplary system in which a combination battery backup/LED driver unit is powered by the unswitched mains voltage in order to drive the lighting elements and charge, and an additional battery module may be connected to the combination unit.

FIG. 14 is a block diagram of an exemplary system in which the line interface circuit is included in the combination battery backup/LED driver unit 1415, and may be powered by the mains voltage to provide an unswitched power supply. A status input 1407 may provide desired on/off status information of the lighting elements 1405 to the combination unit 1415. A separate battery unit 1419 may be included in the exemplary system to provide additional power during emergency operation (e.g., to power additional fixtures, brighter elements, fixtures for a longer period of time, etc.) During normal operation, the line interface circuit may provide power for both battery functions and LED driver functions of the combination unit 1415. The LED driver components of the combination unit 1415 may drive the lighting elements 1405 using an included lighting interface. Charge current for the battery backup components included in the unit 1415 may also be obtained through the included line interface. The separate battery unit 1419 may also be charged through a dedicated charging output 1414 from the combination unit 1415. Control signals for normal operations may be received on control inputs 1409 to the combination unit 1415. Emergency operation may be entered if the status information on control inputs 1409 indicates that the main supply is interrupted. During emergency operation, the battery backup components included in the combination unit 1415 may provide a DC voltage to the included LED driver components, which retain direct control of the lighting elements 1405. If the voltage supplied by the battery backup components is not sufficient during emergency operations, the separate battery unit 1419 may provide additional power to the combination unit 1415, using power output 1418 from the battery 1419.

Figure 15:
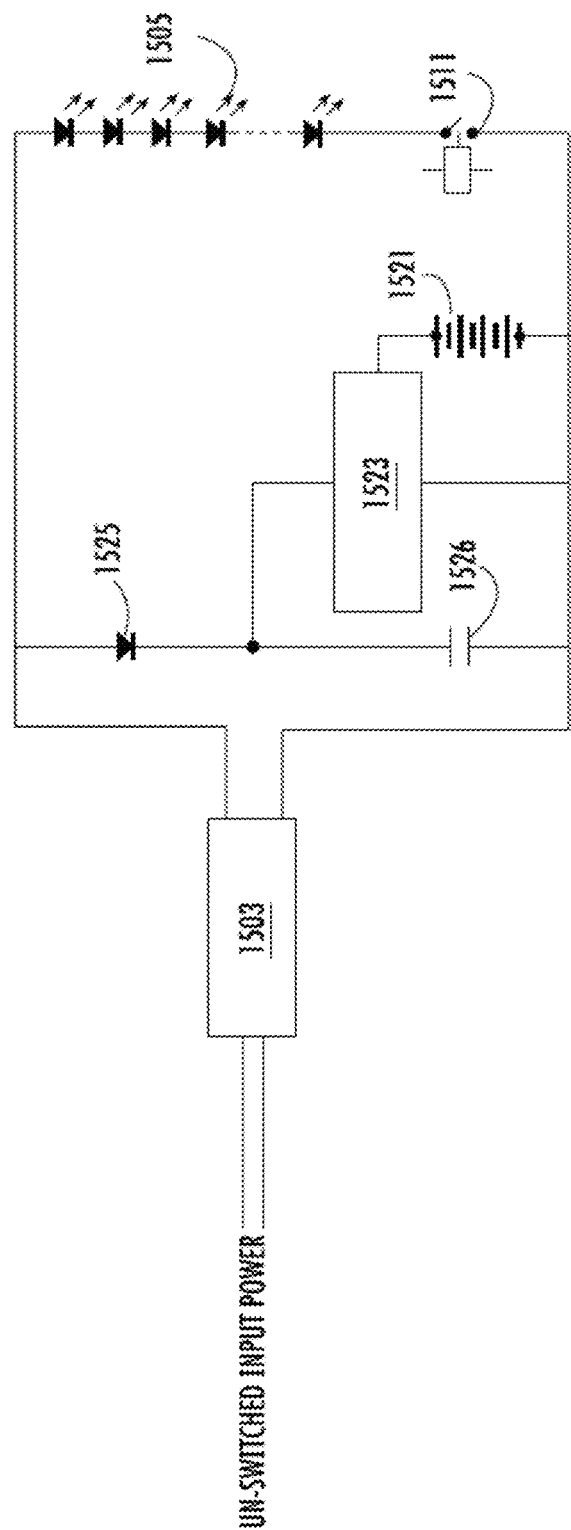
FIG. 15 is a block diagram of an exemplary system for obtaining charge current for the battery backup unit via a parallel connection with the LEDs, using a voltage step-down or buck converter.
Figure 16:
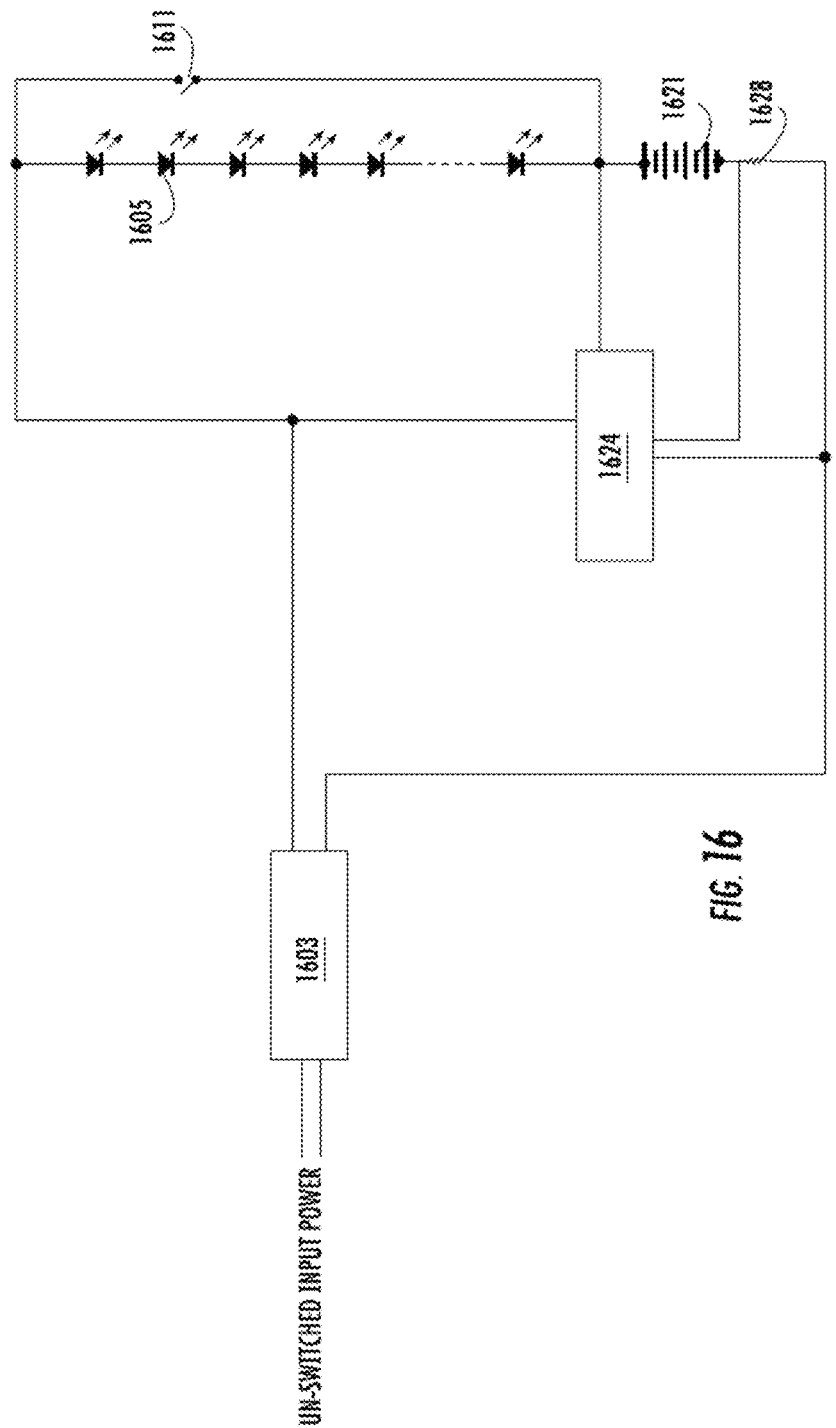
FIG. 16 is a block diagram of an exemplary system for obtaining charge current for the battery backup unit via a series connection with the LEDs, using a voltage step-up or boost converter to boost the battery voltage during emergency operation.
Figure 17:
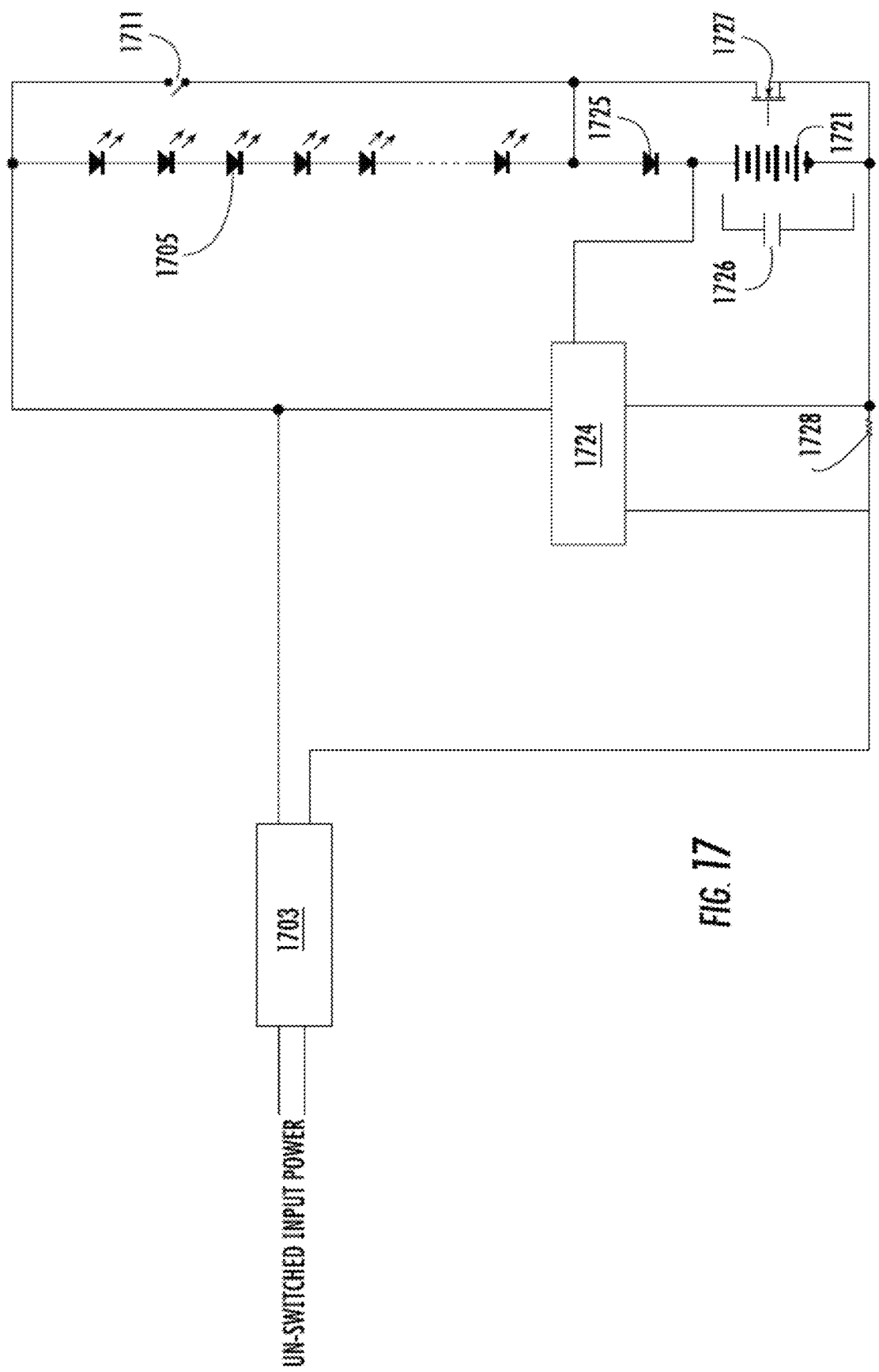
FIG. 17 is a block diagram of an exemplary system for obtaining charge current for the battery backup unit via a series connection with the LEDs, using a shunt control to regulate the charge current and a voltage step-up or boost converter to boost the battery voltage during emergency operation.

FIGS. 15, 16, and 17 are block diagrams representing exemplary systems capable of deriving charge current for the battery backup module from the LED circuit. The systems represented by these figures may be implemented independently; in conjunction with one of the systems described above, such as the exemplary system represented by FIG. 2; or in conjunction with a system not described herein.

FIG. 15 is a block diagram of an exemplary system to derive charging current using a buck converter 1523 (voltage step-down converter) which is sourced from a higher voltage LED lighting element 1505. The LED driver 1503 may receive unswitched power from the main power supply through an included line interface circuit. Emergency operation may be entered if the main power supply is detected to be interrupted. The lighting interface included in the LED driver 1503 may be connected to the lighting elements 1505 electrically in parallel with the battery backup components. The lighting elements 1505 may be further electrically in series with an on/off switch 1511, which may be a series switch, relay, FET, or any suitable switching components known to those skilled in the art, to provide desired on/off status of the lighting elements 1505.

The battery backup components may comprise a diode 1525 connected in series from the driver/light element circuit to a capacitor 1526 and the converter/battery subcircuit. The capacitor 1526 and the converter/battery subcircuit may be connected in parallel. The converter/battery subcircuit may be comprised of a battery 1521 connected as an electrical output load of a buck converter 1523. The buck converter 1523 may be implemented using microprocessor control for various charging algorithms, as apparent to those skilled in the art. During normal operation, the driver 1503 may drive the lighting elements 1505, while the converter 1523 may supply the desired charge current to the battery 1521. The converter 1523 may retain the peak voltage supplied by the included lighting interface of the LED driver 1503, even if the lighting elements 1505 are dimmed or operated in a PWM mode. During emergency operation, charging of the battery backup module 1501 may cease, and the battery 1521 may supply power to drive the lighting elements 1505.

FIG. 16 is a block diagram of an exemplary system to derive charging current using the current output from an LED lighting element 1605. The LED driver 1603 may receive unswitched power from the main power supply through an included line interface circuit. Emergency operation may be entered if the main power supply is detected to be interrupted. The lighting interface included in the LED driver 1603 may be connected to a boost converter 1624 (voltage step-up converter) in parallel to the lighting elements/battery subcircuit. The lighting elements/battery subcircuit may be comprised of the lighting elements 1605 in parallel with an on/off switch 1611, further in series with the battery 1621 and a resistor 1628. The boost converter may have additional connections to electrical points between the light elements 1605 and the battery 1621, and between the battery 1621 and the resistor 1628. The on/off switch 1611 may be a series switch, relay, FET, or any suitable switching components known to those skilled in the art. The current to drive the LED elements 1605 and the current to charge the battery 1621 are compatible in this exemplary system.

During normal operation, the driver 1603 may control the lighting elements 1605, while the battery 1621 may receive the desired charge current through the connected light elements 1605. The on/off switch 1611 may be closed when the elements 1605 are turned off, to allow charge current to continue to flow to the battery 1621. During emergency operation, the battery 1621 may supply power to drive the lighting elements 1605. The boost converter 1624 may increase the voltage supplied by the battery 1621 to a level adequate to drive the lighting elements 1605. The on/off switch 1611 may be opened during emergency operations, to allow the emergency power to flow from the battery 1621 to the light elements 1605.

FIG. 17 is a block diagram of an alternate exemplary system to derive charging current using the current output from an LED lighting element 1705. Operation of the system is described below. The configuration of the system is similar to that described by FIG. 16, except that a diode 1725 may be added in series between the LED elements 1705 and the battery 1721; a shunt charge 1727 control may be added electrically in parallel to the diode 1725 and the battery 1721; a capacitor 1726 for filtering may optionally be added in parallel with the battery 1721; and the additional connections of the boost converter 1724 may be connected to electrical points between the battery 1721 and the diode 1725, and between the battery 1721 and the resistor 1728. The on/off switch 1711 may be a series switch, relay, FET, or any suitable switching components known to those skilled in the art. The current to drive the LED elements 1705 and the current to charge the battery 1721 need not compatible in this exemplary system. Algorithms to control the charge current may be implemented, including using microprocessor control. Charge current may be terminated using the shunt charge control 1727.

During normal operation, the driver 1703 may drive the lighting elements 1705, while the battery 1721 may receive the desired charge current through the connected light elements 1705. The shunt charge control may regulate the current output from the LED elements 1705, so that battery 1721 charge current may be less than the output from LED element 1705. The on/off switch 1711 may be closed when the elements 1705 are turned off, to allow charge current to continue to flow to the battery 1721. Emergency operation may be entered if the main power supply is detected to be interrupted. During emergency operation, the battery 1721 may supply power to drive the lighting elements 1705. The boost converter 1724 may increase the voltage supplied by the battery 1721 to a level adequate to drive the lighting elements 1705. The on/off switch 1711 may be opened during emergency operations, to allow the emergency power to flow from the battery 1721 to the light elements 1705.

It will be apparent to those skilled in the art that the described exemplary systems are generally descriptive and not limiting. The systems or components of the systems may be recombined, or substituted with generally-known equivalent systems or components, without changing the inventive aspect. An equivalent component here also includes equivalent inputs and outputs, such as (but not limited to) an equivalent input to indicate status information regarding the main power supply or the lighting elements. Such equivalent systems are deemed to be within the scope of the invention, and infringement occurs, if only by equivalents, if the equivalent system performs the inventive functions claimed.

The foregoing is provided for purposes of illustrating, explaining, and describing aspects of the present invention. Further modifications and adaptations to these examples will be apparent to those skilled in the art and may be made without departing from the scope or spirit of the invention. Different arrangements of the components depicted in the drawings or described above, as well as components not shown or described are possible. Similarly, some features and subcombinations are useful and may be employed without reference to other features and subcombinations. The exemplary systems represented here may be implemented independently, in conjunction with a different one of the systems described above, or in conjunction with a system not described herein.

What is claimed is:

1. An emergency lighting system, comprising:
   a combination unit including battery backup components and an LED driver module, wherein the combination unit includes a first output comprising an interface capable of controlling a plurality of LEDs, and a second output capable of providing charging current to an additional battery unit,
   wherein the combination unit includes line interface circuitry for connecting the combination unit to a power supply,
   wherein the combination unit includes a status input capable of receiving information about a status of the power supply, indicating if the power supply is interrupted,
   wherein the battery backup components are capable of receiving a charging current via the line interface circuitry when the power supply is uninterrupted,
   wherein the battery backup components provide DC voltage to the LED driver module during an interruption in the power supply, and
   wherein the additional battery unit provides additional DC voltage to the LED driver module during an interruption in the power supply.

2. The emergency lighting system of claim 1, the combination unit further including a control input configured for receiving external control signals, wherein the LED driver module is configured to control the plurality of LEDs based on the external control signals when the power supply is uninterrupted.

3. The emergency lighting system of claim 2, wherein the status input is received via the control input to the combination unit.

4. The emergency lighting system of claim 2, wherein the external control signals comprise information related to a test of the system, a test of a subcomponent of the system, or a monitored level of the system.

5. The emergency lighting system of claim 2, wherein the external control signals comprise information related to an input selecting a power status, a dimming level, or a color level of the plurality of LEDs.

6. The emergency lighting system of claim 1, wherein the LED driver module is configured to control the plurality of LEDs via the interface during the interruption in the power supply and when the power supply is uninterrupted.

7. The emergency lighting system of claim 1, wherein the combination unit is configured to provide the charging current to the additional battery unit via the second output when the power supply is uninterrupted.

8. An emergency lighting system, comprising:
   a combination unit including battery backup components and an LED driver module; and
   an additional battery unit,
   wherein the combination unit includes a lighting interface capable of controlling a plurality of LEDs, and a charging interface capable of providing charging current to the additional battery unit,
   wherein the combination unit includes line interface circuitry for connecting the combination unit to a power supply,
   wherein the combination unit is configured to receive information about a status of the power supply, indicating if the power supply is interrupted,
   wherein the battery backup components are capable of receiving a charging current via the line interface circuitry when the power supply is uninterrupted, and
   wherein the battery backup components and the additional battery unit provide DC voltage to the LED driver module during an interruption in the power supply.

9. The emergency lighting system of claim 8, the combination unit further including a control input configured for receiving external control signals, wherein the LED driver module is configured to control the plurality of LEDs based on the external control signals when the power supply is uninterrupted.

10. The emergency lighting system of claim 9, wherein the information about the status of the power supply is received via the control input to the combination unit.

11. The emergency lighting system of claim 8, wherein the LED driver module is configured to control the plurality of LEDs via the lighting interface during the interruption in the power supply and when the power supply is uninterrupted.

12. The emergency lighting system of claim 8, wherein the combination unit is configured to provide the charging current to the additional battery unit via the charging interface when the power supply is uninterrupted.

13. A method of controlling an emergency lighting system, the method including operations comprising:
receiving, at a combination unit including battery backup components and an LED driver module, a status input indicating if a power supply to the combination unit is interrupted;
providing, via a lighting interface of the combination unit, a control signal to a plurality of LEDs;
providing, via a charging interface of the combination unit, a charging current to an additional battery unit;
receiving, by the battery backup components, a charging current when the power supply is uninterrupted;
providing, from the battery backup components, a DC voltage to the LED driver module during an interruption in the power supply; and
providing, from the additional battery unit, additional DC voltage to the LED driver module during the interruption in the power supply.

14. The method of claim 13, the combination unit further including a control input configured for receiving external control signals, and the method further comprising controlling, by the LED driver module, the plurality of LEDs based on the external control signals when the power supply is uninterrupted.

15. The method of claim 14, wherein the status input is received via the control input to the combination unit.

16. The method of claim 14, wherein the external control signals comprise information related to a test of the system, a test of a subcomponent of the system, or a monitored level of the system.

17. The method of claim 14, wherein the external control signals comprise information related to an input selecting a power status, a dimming level, or a color level of the plurality of LEDs.

18. The method of claim 13, wherein the LED driver module is configured to control the plurality of LEDs via the lighting interface during the interruption in the power supply and when the power supply is uninterrupted.

19. The method of claim 13, wherein the combination unit is configured to provide the charging current to the additional battery unit via the charging interface when the power supply is uninterrupted.

* * * * *